Patented May 7, 1946

2,400,001

UNITED STATES PATENT OFFICE 2,400,001

PROCESS OF MOLDING CERAMIC MATERIAL

Logan D. Grupelli, East Orange, N. J., assignor to National Oil Products Company, Harrison, N. J., a corporation of New Jersey No Drawing. Application March 11, 1942, Serial No. 434,303

5 Claims. (Cl. 25—156)

This invention relates to lubricating agents used in the manufacture of brick and tile and other articles produced from clay or similar materials, more particularly to improved lubricants for all types of molds or dies for stamping, extruding, molding or otherwise processing moist plastic clays or other plastic ceramic materials in the manufacture of articles such as bricks, ceramic sewer pipes, tile, porcelain tubes, etc.

It is well known that mineral oils, which may or may not be blended with animal, vegetable, or marine oils, have been used for many years in the lubrication of brick stamping machines and all kinds of extrusion dies for the making of brick and ceramic sewer pipes, as well as other similar ceramic objects. However, such lubricants have not been entirely satisfactory due to the fact that such ceramic materials are worked in a more or less moistened state and such oils do not satisfactorily wet these materials or their surfaces. The lubricant tends to concentrate in spots here and there, and is spread on the surfaces of the materials by physical force rather than by natural capillary attraction. Various attempts have been made to improve these oils for lubrication. For example, oil-in-water emulsions of such oils have been prepared and have been used to some extent, but these oil-in-water emulsions have not worked any more satisfactorily than the oils themselves. One of the principal reasons that such emulsions do not work properly is that the outer water phase wets the clay particles to such an extent that the oil, instead of merely lubricating the particles, penetrates therein and softens the surface thereof. Instead of giving a lubricating action, the emulsions, if anything, increase the sticking of the ceramic body to the dies or molds. It has not been possible to obtain entirely satisfactory lubrication with either the oil-in-water emulsions or the oil alone, and in either case since the lubrication has not been satisfactory, it has tended to cause the surface of the finished ceramic articles to be rough, pitted and have voids therein.

It is the object of this invention to provide improved lubricants for lubricating the surfaces of dies, molds, and similar devices which come in contact with moist plastic ceramic materials during the manufacture of bricks, ceramic sewer pipes, tile, porcelain tubes and similar ceramic articles.

A further object of this invention is to prevent the sticking of wet ceramic clays to metallic surfaces on which such clays are being worked.

Another object of the invention is to increase the wettability of mineral, vegetable or animal oils or blends thereof upon a wet clay body.

Still another object of the invention is to provide means, whereby smoother surfaces on finished ceramic objects may be obtained.

Other objects of the invention will in part be obvious and will in part appear hereinafter.

I have found that the above and other objects of the invention may be accomplished by the use of lubricants comprising water-in-oil emulsions, particularly water-in-oil emulsions which are relatively fluid. Since the oil component of my emulsions comprises the outer phase thereof, it might be expected that only slightly better results as regards uniform lubrication would be obtained than when using the oil alone. However, such is not the case, but instead my emulsions have excellent wettability and provide exceedingly uniform surface films, thus giving the essential lubrication between the surfaces of the dies and molds and the moistened plastic ceramic materials. Furthermore, the water-in-oil emulsions do not penetrate into the clay body such as is the case with the emulsions of the oil-in-water type. As aforementioned, the penetration of the oil-in-water emulsions tends to soften the surface of the ceramic article and instead of having a lubricating action, such emulsions, if anything, increase the adherence of the plastic ceramic objects to the metallic surfaces, with the result that smooth surfaces on the finished article are not obtainable. In preparing the emulsions of this invention any suitable oil may be used, such as, for example, kerosene, paraffin oil, light grades of petroleum oil, etc. However, I prefer to use a light mineral oil, e. g. one having a viscosity of around 40" S. U. V. at 100° F. such as the grade of mineral oil known to the trade as "mineral seal oil," which may, if desired, be blended with vegetable, animal or marine oils or with heavier mineral oils.

Any emulsifier which produces relatively fluid water-in-oil emulsions may be employed in the process of this invention. A large number of emulsifiers which predominantly form water-in-oil emulsions tend to form emulsions which are somewhat creamy, viscous or pasty, especially when the emulsions contain relatively high percentages of water. In some cases such emulsions may be used in the process of this invention, but it is highly preferred to employ emulsions which are relatively fluid. The more viscous emulsions may in some cases be used where the lubricant is applied to the ceramic article or to the metallic surface of dies by some means of pressure feed. However, in most instances in order to readily obtain uniform distribution of the lubricant with the least amount of difficulty, it is necessary that water-in-oil emulsions which are relatively fluid be employed. Suitable emulsifiers which will produce relatively fluid-water-in-oil emulsions are diamides such as are formed by the reaction of ethanol ethylene diamine with a higher fatty acid such as stearic or oleic acid or with esters of such acids followed by reaction of the resulting monoamide with a low molecular weight acid or acid anhydride such as acetic acid or acetic anhydride to form a diamide. Other suitable low molecular weight acids and acid anhydrides include propionic acid, propionic anhydride, butyric acid, butyric anhydride, etc. Amides of the foregoing type are generally represented by the following structural formula:

wherein R stands for a group selected from the class consisting of alkyl and alkylene groups containing at least 11 carbon atoms and $R_1$ represents an alkyl group containing from 1 to 3 carbon atoms. It is not necessary to completely convert the monoamides to diamides in order to obtain emulsifiers suitable for use in the emulsions which I employ. Thus mixtures of mono and diamides of the above type may be used although I prefer in most cases to completely convert the monoamide to a diamide. The foregoing process for the preparation of the above polyamides is similar to that described in greater detail in U. S. Patent No. 2,345,632 issued April 4, 1944.

In preparing the water-in-oil emulsions, the mineral oil or other oil which is being used is mixed with the emulsifier, preferably at a somewhat elevated temperature, water is then added to the oil in small quantities with rapid agitation until the desired percentage of water has been incorporated into the emulsion. The emulsions are more readily prepared if the water which is added is also at a relatively elevated temperature. Emulsions prepared in the above manner using the preferred emulsifiers are very fluid and are readily applied to the surfaces of the dies or molds or other devices which are to come in contact with the moist, plastic ceramic objects or to the ceramic articles themselves. The ratio of water to oil in the emulsions may vary considerably; however, in most cases I prefer that the emulsions contain between about 50% and about 80% or more of water.

These lubricants may be used in many phases of ceramic manufacture; they are particularly adapted to the lubrication of the metallic surfaces of extrusion dies used in the formation of bricks, field tile, porcelain tubes, etc., and of the surfaces of stamping dies used in stamping the manufacturer's name, trade-mark or other designs on the formed brick. They are also quite useful in lubricating extrusion dies employed in the manufacture of sewer pipe and similar ceramic pipes. Also the water-in-oil emulsions are quite applicable to the lubrication of cast iron molds used in the manufacture of carborundum bricks. It is well known that carborundum is very abrasive, and these cast iron molds rapidly wear out due to this abrasive action of the moist carborundum particles. Various attempts have been made to lubricate these molds with certain oils, but in most cases the lubrication has not proved to be entirely satisfactory. My lubricants very efficiently lubricate these molds and aid in preventing the destruction thereof. The emulsions very effectively wet the metallic surfaces of the molds and provide uniform lubrication between the mold and the carborundum. Furthermore, since the total amount of oil used when employing the water-in-oil emulsions is much less than when using oil alone, it is much less expensive to utilize the emulsions for such purposes than it is to employ the oil alone. A further use of these lubricants is in the manufacture of various types of ceramic electrical insulating materials such as that known by the trade name of "Steatite," and other similar materials. Various oils are frequently incorporated into the raw materials used in making such insulators in order to increase the plasticity of the raw material while it is being worked. The lubricants of this invention will very efficiently and inexpensively provide the desired plasticity of these materials during the manufacturing process. The emulsions not only have excellent lubricative action similar to that of an oil, but in addition they very effectively wet the individual particles and thus further increase the effectiveness of the lubrication.

In the specification and claims hereinafter, the term "ceramic materials" will be employed in its narrow and original sense to denote the unburned materials which are formed into shapes and thereafter sintered at high temperatures as distinguished from the broader corrupt meaning of this word as sometimes used to denote materials such as cement, glass, etc.

The liquid emulsions may be applied to the metallic surfaces of the dies or other devices or to the ceramic materials themselves in any suitable manner, such as, for example, by wetting tubes, by hand swabbing, by felt pads or by other usual methods. Also the emulsions may be used in pressure feeds, such as are used for lubricating brick dies. In the latter case, if it is desired, the emulsions may be somewhat more viscous than is the usual case.

For a fuller understanding of the nature and objects of the invention, reference should be had to the following example which is given merely to further illustrate the invention and is not to be construed in a limiting sense, all parts given being by weight.

A suitable lubricant for the lubrication of bricks which are to be run through a brick stamping machine or for the lubrication of brick extrusion dies may be prepared as follows:

To 22 parts of "mineral seal oil" add 2.5 parts of an emulsifier prepared by reacting 65 parts of teaseed oil with 22 parts of ethanol ethylene diamine followed by the reaction of the resulting product with 11 parts of acetic anhydride. To the mineral oil containing the emulsifier, there is slowly added with rapid agitation 75 parts of hot water. The emulsion obtained is a fluid liquid which may be readily applied by merely dripping it onto the bricks by means of wetting tubes just prior to passing the bricks through the stamping machine, and for lubricating the extrusion dies, it may be applied by means of pressure feeds.

It is evident from the above description that the emulsions of this invention are capable of wide application in the manufacture of brick, tile, porcelain tubes and similar ceramic objects. Since the lubricants have very uniform wettability and provide uniform surface films and consequent good lubrication, without penetrating into the surfaces of clays or other ceramic materials being worked, they will be of wide interest to manufacturers of such ceramic articles as are referred to hereinabove.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A lubricant for the surfaces of metallic molds for ceramic compositions comprising a water-in-oil emulsion containing mineral oil, water, and an emulsifier comprising a diamide formed by reacting ethanol ethylene diamine with a substance selected from the group consisting of higher fatty acids and esters thereof, followed by reacting the resulting monoamide with a compound selected from the group consisting of lower fatty acids and anhydrides of said acids.

2. A lubricant for the surfaces of metallic molds for clay comprising a water-in-oil emulsion containing mineral oil, water, and an emulsifier comprising a diamide formed by reacting ethanol ethylene diamine with a substance selected from the group consisting of higher fatty acids and esters thereof, followed by reacting the resulting monoamide with a compound selected from the group consisting of lower fatty acids and anhydrides of said acids.

3. In a process of molding a moist plastic ceramic material preparatory to firing the same, wherein the moist plastic ceramic material is shaped by means of a metallic die, the step which comprises interposing between the surface of the die and the moist plastic ceramic material a lubricating film of a water-in-oil emulsion comprising mineral oil, water, and a diamide formed by reacting ethanol ethylene diamine with a substance selected from the group consisting of higher fatty acids and esters thereof, followed by reacting the resulting monoamide with a compound selected from the group consisting of lower fatty acids and anhydrides of said lower fatty acids.

4. In a process of shaping a moist plastic ceramic material preparatory to firing the same, wherein the moist plastic ceramic material is shaped by means of a metallic die, the step which comprises interposing between the surface of the metallic die and the moist plastic ceramic material, a lubricating water-in-oil emulsion comprising mineral oil, water, and an emulsifier comprising a diamide formed by reacting ethanol ethylene diamine with a substance selected from the group consisting of higher fatty acids and esters thereof, followed by reacting the resulting monoamide with acetic anhydride.

5. In a process of shaping a moist plastic ceramic material preparatory to firing thereof, wherein the moist plastic ceramic material is shaped by means of a metallic die, the step which comprises interposing between the surface of the metallic die and the moist plastic ceramic material a lubricating water-in-oil emulsion comprising mineral oil, water, and an emulsifier having the formula

wherein R stands for a group selected from the class consisting of alkyl and alkylene groups containing at least 11 carbon atoms and $R_1$ represents an alkyl group containing from 1 to 3 carbon atoms.

LOGAN D. GRUPELLI.